United States Patent [19]

Rubin et al.

[11] Patent Number: 4,497,176

[45] Date of Patent: Feb. 5, 1985

[54] BRAKE SYSTEM PRESSURE BLEED DEVICE

[75] Inventors: Frank D. Rubin, Mesa; Roger A. Schumacher, Chandler, both of Ariz.

[73] Assignee: General Motors Corporation, Detroit, Mich.

[21] Appl. No.: 494,508

[22] Filed: May 13, 1983

[51] Int. Cl.³ .......................... B60T 11/30; F15B 7/10
[52] U.S. Cl. ........................................ 60/584; 60/585; 60/592; 92/79; 188/352
[58] Field of Search ................ 60/584, 585, 586, 592; 188/352; 92/79, 87; 137/883, 886

[56] References Cited

U.S. PATENT DOCUMENTS

| | | | |
|---|---|---|---|
| 2,633,002 | 3/1953 | Radus | 60/592 |
| 3,183,673 | 5/1965 | Schwarz | 188/352 |
| 3,499,464 | 3/1970 | Williams et al. | 137/883 |
| 3,566,917 | 3/1971 | White | 137/883 |
| 4,170,280 | 10/1979 | Schwarz | 188/352 |
| 4,201,056 | 5/1980 | De Martelaere et al. | 60/584 |
| 4,415,071 | 11/1983 | Butler et al. | 188/352 |

Primary Examiner—Robert E. Garrett
Assistant Examiner—Scott L. Moritz
Attorney, Agent, or Firm—D. D. McGraw

[57] ABSTRACT

A stationary pressure bleed stem and a movable pressure bleed stem are mounted on a base plate to adjust for varied spacing between the master cylinder ports at the reservoir bottom. The fixture is clamped over the master cylinder reservoir. The stems may be interchangeable with other similar stems of various dimensions to accommodate for variations in dimensions of different master cylinders. The device simplifies and expedites pressure bleeding of master cylinders having different configurations.

2 Claims, 4 Drawing Figures

BRAKE SYSTEM PRESSURE BLEED DEVICE

The invention relates to a device to be connected to a vehicle brake master cylinder so that brake fluid is selectively supplied to the brake hydraulic system from a pressure source to bleed the system of air. It more particularly relates to such a device which may be quickly and easily adapted to fit various master cylinder configurations.

It is common to use a pressure bleed arrangement to eliminate air bubbles in vehicle brake systems. Since there are numerous different master cylinder configurations, it is desirable to have a device available which may be readily adapted to any of several such master cylinders so as to minimize the amount of time required in changing from a master cylinder of one configuration to a master cylinder of a somewhat different configuration. Most master cylinders in use today are of the dual pressurizing chamber type and have separate fluid reservoir compartments respectively connected through separate compensation ports to the pressurizing chambers. The reservoir and master cylinder body is normally constructed so that ports lead from the bottoms of the reservoir compartments through the compensation ports to the master cylinder body. These ports may be at the same height relative to the master cylinder body when, for example, the master cylinder has no quick take-up pressurizing chamber and the two pressurizing chambers are of the same size. In other master cylinders, the two pressurizing chambers may be of the same size while a quick take-up chamber of larger diameter is also provided, causing the port serving the compensation ports for the quick take-up chamber and the pressurizing chamber adjacent the quick take-up chamber to be higher than the port serving the other pressurizing chamber. Also, the ports may be spaced at various distances along the axis of the master cylinder body. All these variations contribute to the need for a device which will readily adapt to each master cylinder style.

The fixture embodying the invention is adjustable to allow for variations in port spacing along the axis of the master cylinder body and to allow for variations in port heights. It is readily positioned to serve the ports and when secured in place maintains its adjustment.

IN THE DRAWING

Figure 1:
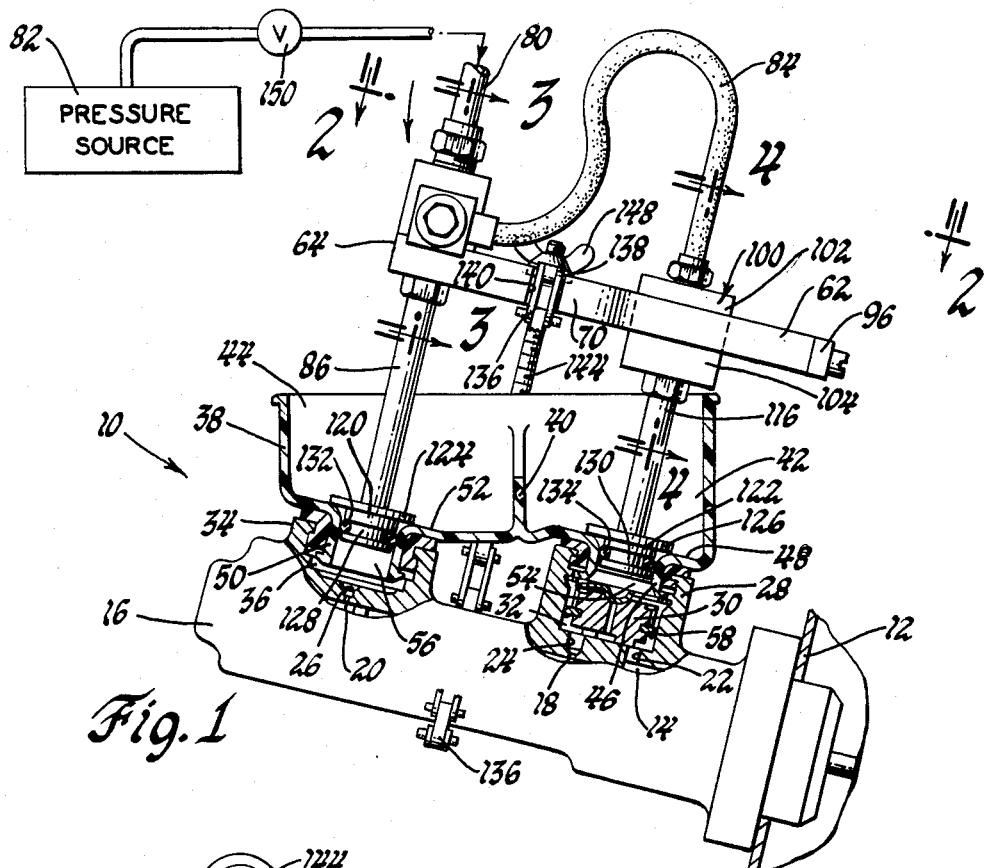
FIG. 1 is an elevation view, with parts broken away and in section, of a master cylinder having a pressure bleed device embodying the invention installed in place.
Figure 2:
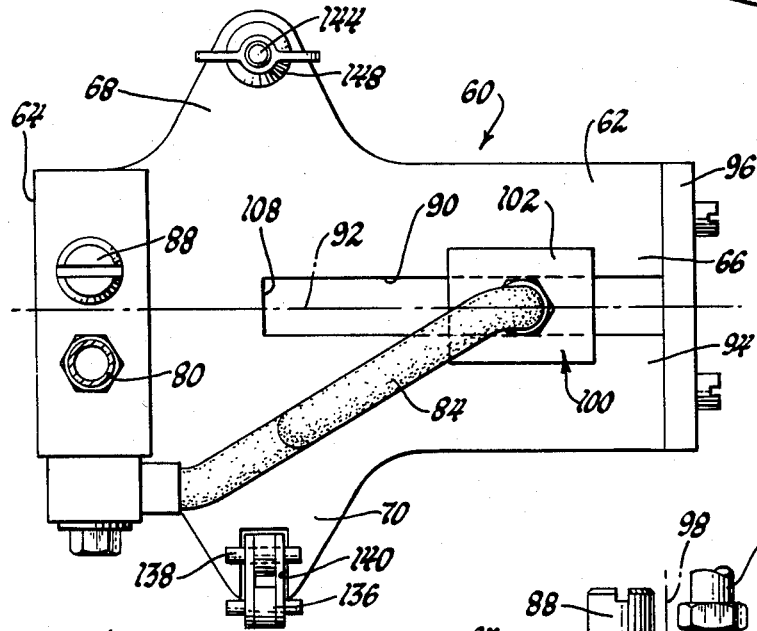
FIG. 2 is a plan view of the pressure bleed device of FIG. 1 and is taken in the direction of arrows 2—2 of that Figure.
Figure 3:
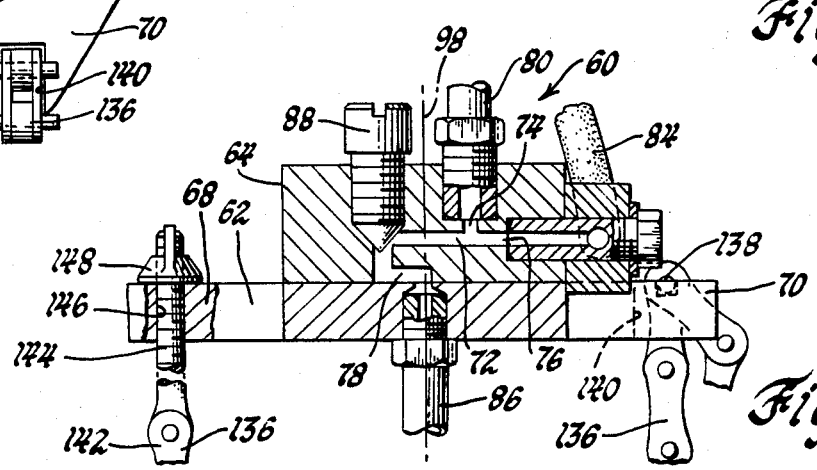
FIG. 3 is a cross section view, with parts broken away, of a portion of the bleed device of FIG. 1 and is taken in the direction of arrows 3—3 of that Figure.

The master cylinder 10 is illustrated in its installed position in a typical vehicle 12. While not shown, the master cylinder serves two hydraulic brake circuits forming brake fluid flow paths as parts of the vehicle brake system. The master cylinder illustrated is of the quick take-up type such as that disclosed in U.S. patent Ser. No. 284,062 entitled "Valve Assembly" filed on July 16, 1981. It has a quick take-up pressurizing chamber 14 in a housing 16, as well as a primary pressurizing chamber 18 and a secondary pressurizing chamber 20. Master cylinder 10 is actuated in the usual manner to pressurize brake fluid in chambers 18 and 20 for the separate brake circuits, while initially providing a relatively large volume of displaced brake fluid at a relatively low pressure from the quick take-up chamber, in a manner well known in the art. Compensation ports 22, 24 and 26 respectively serve chambers 14, 18 and 20. A boss 28 has a quick take-up valve assembly 30 in its chamber 32, with ports 22 and 24 opening into the bottom of the boss chamber 32. Another boss 34 has a chamber 36, through the bottom of which port 26 is formed. The master cylinder reservoir 38 is divided by a wall 40 into reservoir chambers 42 and 44. A mounting tube 46 extends from the bottom 48 into the chamber 32 and boss 28. A similar mounting tube 50 extends from the bottom 52 of chamber 44 into chamber 36 of boss 34. The mounting tubes sealingly secure the reservoir 38 to the master cylinder housing, as is illustrated and described in the above noted patent application. The tubes 46 and 50 respectively define ports 54 and 56 which provide fluid communication between the reservoir chambers 42 and 44 and the pressurizing chambers of the master cylinder through the compensation ports. Since there is no valve arrangement in port 56 and chamber 36, there is always direct communication between the reservoir chamber 44 and the compensation port 26. The quick take-up valve assembly 30 in chamber 32, more fully described in the above noted patent application, at times prevents full brake fluid connection between reservoir chamber 42 and compensation ports 22 and 24. However, when brake fluid pressure is introduced through port 54 which is greater than the pressure in compensation ports 22 and 24, it may pass around the valve assembly 30 due to the action of the cup seal 58. This is the usual manner in which brake fluid from reservoir chamber 42 is delivered to the master cylinder. This action is also described more fully in the above noted application.

The pressure bleed device 60 includes a base plate 62 which has a head end 64, a slide mounting portion 66 and securing portions 68 and 70. The head end 64 has a connector passage 72 formed therein. Three ports 74, 76 and 78 connect with passages 72 and to the head end exterior. Port 74 has a supply conduit 80 connected thereto. Conduit 80 is also connected to a schematically illustrated pressure source 82. The pressure source contains hydraulic brake fluid under a pressure suitable for the pressure bleeding operation. For example, the pressure may be about 25 p.s.i.

Another conduit 84 is connected to port 76. This conduit is preferably a flexible hose and leads to another portion of the device to be described. The third port 78 has provision for the secure sealing connection of a tubular brake fluid filler stem 86. Stem 86 extends downwardly from the base plate 62. A variable restriction valve 88 is provided within port 78 so as to be able to modify the fluid flow from the connector passage 72 to the filler stem 86 to balance the pressure being delivered by the device, the valve compensating for differences in fluid path restrictions.

The slide mounting portion 66 of base plate 62 includes a slot 90 extending along the slide axis 92 from an area adjacent the head end 64 to the opposite end 94 of base plate 62 from the head end. The slot 90 opens through end 94 and is normally closed at end 94 by an end cover plate 96 suitably secured to the base plate end 94. The slide axis 92, if extended through head end 64 will intersect the axis 98 of filler stem 86. Axis 98 extends through the outlet portion of the third port 78. Therefore, slot 90 is in alignment with port 78.

Figure 4:
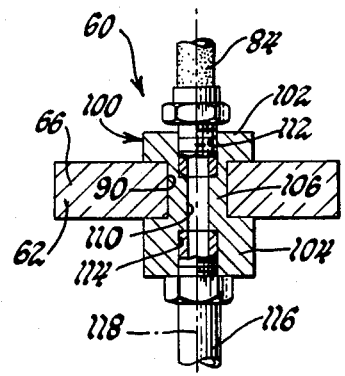
FIG. 4 is a cross-section view, with parts broken away, of another portion of the bleed device of FIG. 1 and is taken in the direction of arrows 4—4 of that Figure.

A slide head 100 is slidably mounted in slot 90 before end cover plate 96 is attached. The slide head is formed with an upper side 102 and a lower side 104 connected by an intermediate portion 106. As can be seen clearly in FIG. 4, the side walls of intermediate portion 106 are in close sliding engagement with the side walls of slot 90. The adjacent surfaces of the slide head upper side 102 and the base plate slide mounting portion 66 are also in close sliding engagement, as are the adjacent surfaces of the slide head lower side 104 and the slide mounting portion 66. The slide head is moveable throughout the length of slot 90, being limited by the slot closed end 108 in its approach to the head end 64 and by the end cover plate 96 in its approach to the opposite end 94. The slide head has a passage 110 extending therethrough so that one passage end 112 opens through the upper side 102, and the other passage end 114 opens through the lower side 104. The flexible conduit 84 is connected to the end 112 of passage 110. A second tubular filler stem 116 is sealingly secured in the lower end 114 of passage 110 so that any hydraulic brake fluid provided to passage 110 through conduit 84 is directly transmitted to the interior of the filler stem 116. Filler stem 116 extends downwardly relative to the sliding head 100 and base plate 62 so that its axis 118 is parallel to the axis 98 of filler stem 86 and lies in the same plane with stem axis 98 and slide axis 92. Thus, filler stem 116 is translatably moveable in the plane containing axes 92, 98 and 118.

The respective free ends 120 and 122 of filler stems 86 and 116 are respectively provided with flanges 124 and 126, and seal grooves 128 and 130. O-ring seals 132 and 134 are respectively received in grooves 128 and 130 on respective stem ends 120 and 122. In the installed position illustrated in FIG. 1, flanges 124 and 126 respectively engage the reservoir chamber bottoms 52 and 48 so that the O-ring seals 132 and 134 are positioned to sealingly engage the mounting tube inner walls defining ports 54 and 56. Thus when installed, the filler stems are sealingly connected to deliver hydraulic brake fluid under pressure through ports 54 and 56 to the compensation ports 22, 24 and 26.

A suitable arrangement is provided for quickly securing and releasing the device to a master cylinder. The arrangement illustrated makes use of a link chain 136 illustrated as being constructed somewhat like a bicycle chain. A link 138 near one chain end fits in a suitably formed slot 140 in the securing portion 70 of base plate 62. The other end 142 of chain 136 has a threaded end piece 144 secured thereto. End piece 144 extends through an aperture 146 formed in base plate securing portion 68. A suitable nut such as wing nut 148 is threaded over the end of threaded end piece 144. The threaded end piece is of sufficient length throughout its threaded section to provide for any necessary adjustment of effective length of chain 136 to tighten and loosen the chain. The chain end containing chain link 138 is looped under the master cylinder housing 16 and the link 138, selected to make the chain fit fairly close around the master cylinder, is inserted in slot 140. Nut 148 is then tightened so that the filler stem flanges 124 and 126 are in secure engagement with the reservoir bottoms 52 and 48 respectively. The chain is located between the filler stems 86 and 116, as seen in FIG. 1, so as to exert substantially equal compression forces through each filler stem to the master cylinder.

When the device is to be installed on a master cylinder having a somewhat different configuration from the last master cylinder on which it was used, the slide head 100 and filler stem 116 are moved within slot 90 so that the filler stems 86 and 116 are approximately at the correct spacing to enter ports 56 and 54 respectively. The device is then positioned over the master cylinder reservoir, the reservoir cover having been removed, so that the filler stems extend toward the ports 54 and 56. The slide head is then moved in the slot 90 any additional amount needed to precisely align the filler stem ends 120 and 122 with ports 56 and 54. The filler stem ends are then inserted into the ports until their flanges 124 and 126 respectively engage the reservoir bottoms 52 and 48. Chain 136 is then looped about the master cylinder housing 16, secured, and tightened by operation of nut 148 to exert compression forces through the filler stems 86 and 116. When the chain is so tightened, the forces also lock the slide head 100 against movement in slot 90 so that the filler stems retain the desired spacing matching the master cylinder ports 54 and 56.

A suitable valve 150, controlling pressure from the pressure source 82, is then opened and hydraulic fluid under pressure enters ports 74 of head end 64 and passes through connector passage 72 to ports 76 and 78. The fluid passing through ports 76 also passes through flexible conduit 84 to passage 110 of slide head 100 and thence to filler stem 116. The fluid passing through port 78 also passes through filler stem 86. The fluid is transmitted under pressure through ports 54 and 56 and compensation ports 22, 24 and 26 into the master cylinder chambers 14, 18 and 20. It passes out of chambers 18 and 20, through the brake circuits of the vehicle brake system, and to the various wheel brakes. The wheel cylinder of each wheel brake is then bled in turn in the well known manner to remove all air in its portion of the circuit connecting the master cylinder and that wheel cylinder. After the bleeding operation is completed, valve 150 is closed, chain 136 is loosened and disconnected at one end and the entire device is removed from the master cylinder 10.

In the particular device illustrated, filler stem 116 is somewhat shorter than filler stem 86 to allow for the differences in the relative dimensions of the quick take-up master cylinder illustrated. If the reservoir bottoms 48 and 52 are in a plane parallel to the axis of the master cylinder housing 16, the filler stems 86 and 116 may be of the same length. Therefore, the filler stems are readily removeable from ports 78 and 114 so that different length filler stems may be quickly installed as required, depending upon the particular master cylinder to which the device is to be attached.

The embodiments of the invention in which an exclusive property or privilege is claimed are defined as follows:

1. A pressure bleed device for bleeding vehicle brake circuits having a master cylinder connected thereto, said device being quickly adapted to various master cylinder configurations having compensation ports accessible for connection of the device to the master cylinder for pressure bleeding the master cylinder and the vehicle brake circuits, which circuits form fluid flow paths, said device comprising:

an elongated base plate having a slide mounting portion and a head end, passage means in said head end including a connector passage, a first port adapted to be selectively connected to a source of brake fluid under pressure, a second port and a third port, all of said ports being in fluid communication with said connector passage, one of said second and third ports having a balance valve for controlling fluid flow therethrough from said connector passage to compensate for differences in fluid flow path restrictions;

a slide head slidably received on said slide mounting portion to be moved toward and away from said third port, said slide head having a fluid passage therethrough;

conduit means flexibly connecting said second port to said slide head fluid passage to provide continuous fluid communication therebetween and permit sliding movements of said slide head on said base plate;

a first tubular brake fluid filler stem having one end removably secured to said base plate to receive brake fluid from said third port;

a second tubular brake fluid filler stem having one end removably secured to said slide head to receive brake fluid from said slide head fluid passage;

said filler stems being adapted to have their other ends operatively sealingly mate with master cylinder ports and to transmit pressurized brake fluid to the master cylinder through the master cylinder compensation ports to pressure bleed the master cylinder and the brake circuits connected thereto;

and means on said base plate for quickly securing said device to the master cylinder in pressure bleed relation and for quickly detaching said device therefrom;

said slide head and said second brake fluid filler stem being slidable before securing action takes place so as to provide for variations in port spacing of various master cylinders to be bled sequentially by use of said device, at least one of said filler stems being interchangeable with filler stems of different lengths so as to provide for variations in relative dimensions of various master cylinders.

2. A pressure bleed fixture for bleeding vehicle brake circuits having a master cylinder connected thereto, said fixture being quickly adapted to various master cylinder configurations having compensation ports accessible for connection of the fixture to the master cylinder for pressure bleeding the master cylinder and the vehicle brake circuits, said fixture comprising:

an elongated base plate having a slide mounting portion and a head end, passage means in said head end including a connector passage, a first port adapted to be selectively connected to a source of brake fluid under pressure to receive pressurized brake fluid therefrom, a second port and a third port, all of said ports being in fluid communication with said connector passage, one of said second and third ports having a balance valve for controlling fluid flow therethrough from said connector passage to compensate for differences in fluid flow path restrictions;

a slide head slidably received on said slide mounting portion to be moved toward and away from said third port, said slide head having a fluid passage therethrough;

conduit means flexibly connecting said second port to said slide head fluid passage to provide continuous fluid communication therebetween and permit sliding movements of said slide head on said base plate;

a first tubular brake fluid filler stem having one end removably secured to said base plate to receive brake fluid from said third port;

a second tubular brake fluid filler stem having one end removably secured to said slide head to receive brake fluid from said slide head fluid passage;

said filler stems being parallel to each other and being adapted to have their other ends operatively sealingly mate with master cylinder ports to transmit pressurized brake fluid to the master cylinder through the master compensation ports to pressure bleed the master cylinder and the brake circuits;

and means on said base plate for quickly securing said fixture to the master cylinder in pressure bleed relation and for quickly detaching said fixture therefrom;

said slide head and said second brake fluid filler stem being slidable before securing action takes place so as to provide for variations in compensation port spacing of various master cylinders to be bled sequentially by use of said fixture and being locked in position on said slide mounting portion while said fixture is secured to the master cylinder by the securing action of said securing means, at least one of said filler stems being interchangeable with filler stems of different lengths so as to provide for variations in relative dimensions of various master cylinders.

* * * * *